United States Patent [19]
Regnier et al.

[11] Patent Number: 6,134,549
[45] Date of Patent: *Oct. 17, 2000

[54] CLIENT/SERVER COMPUTER SYSTEM HAVING PERSONALIZABLE AND SECURABLE VIEWS OF DATABASE DATA

[75] Inventors: Barbara Ann Regnier, Mazeppa; David Nicholas Youngers, Rochester; Richard Dean Dettinger, Rochester; Daniel Arlan Spors, Rochester; John David Thorson, Rochester, all of Minn.

[73] Assignee: Showcase Corporation, Rochester, Minn.

[*] Notice: This patent is subject to a terminal disclaimer.

[21] Appl. No.: 08/414,483

[22] Filed: Mar. 31, 1995

[51] Int. Cl.7 .................................................. G06F 17/30

[52] U.S. Cl. ............................ 707/9; 707/1; 395/200.09; 395/200.47; 395/200.3; 395/200.33; 345/327; 345/330; 345/331; 345/332; 711/147; 711/163

[58] Field of Search ................................ 395/674, 682, 395/683, 200.01, 800, 650, 700, 200.59, 200.47, 200.3, 200.33; 707/1, 9; 711/147, 163; 345/327, 330, 331, 332

[56] References Cited

U.S. PATENT DOCUMENTS

| | | | |
|---|---|---|---|
| 4,882,681 | 11/1989 | Brotz ........................................ | 364/419 |
| 4,980,829 | 12/1990 | Okajima et al. .......................... | 364/419 |
| 5,077,804 | 12/1991 | Richard .................................... | 382/7 |
| 5,175,684 | 12/1992 | Chong ...................................... | 364/419 |
| 5,187,790 | 2/1993 | East et al. ................................. | 395/725 |
| 5,249,293 | 9/1993 | Schreiber et al. ....................... | 395/650 |
| 5,263,157 | 11/1993 | Janis ......................................... | 395/600 |
| 5,321,841 | 6/1994 | East et al. ................................. | 395/725 |
| 5,329,619 | 7/1994 | Page et al. ................................ | 395/200 |
| 5,345,586 | 9/1994 | Hamala et al. .......................... | 395/650 |
| 5,390,297 | 2/1995 | Barber et al. ............................ | 395/200 |
| 5,410,693 | 4/1995 | Yu et al. ................................... | 395/602 |
| 5,414,844 | 5/1995 | Wang ....................................... | 395/650 |
| 5,430,876 | 7/1995 | Schreiber et al. ....................... | 395/650 |
| 5,432,899 | 7/1995 | Iwatani et al. ........................... | 395/145 |
| 5,455,953 | 10/1995 | Russell .................................... | 395/739 |
| 5,551,055 | 8/1996 | Matheny et al. ........................ | 395/882 |
| 5,553,239 | 9/1996 | Heath et al. ....................... | 395/187.01 |
| 5,560,008 | 9/1996 | Johnson et al. ......................... | 395/650 |

(List continued on next page.)

OTHER PUBLICATIONS

Chen, S.S., et al., "The Design and Implementation of a Full–Fledged Multiple DBMS", *IEEE,* 67–68, (1995).

Ordille, J.J., et al., "Distributed Active Catalogs and Meta–Data Caching in Descriptive Name Services", *IEEE,* 120–129, (1993).

Novell, "Netware Version 3.11", pp. 225–230, 190–200, Mar. 1991.

Nancy K. Woodfield "An Evaluating the security of an Air force Type Network" IEEE P(53–62), Jan. 1990.

Raju Ramaswamy "Data confidentiality service on top of transmission control protocol/Internet protocol" IEEE p(454–460), Jan. 1990.

Novell "Netware Installation" Novell, Incorporated For Netware v3.11 p(185–324), Mar. 1991.

Co–pending U.S. application No. 08/623,616, filed Mar. 29, 1996, entitled "Client/Server Computer System", (pending).

*Primary Examiner*—Thomas G. Black
*Assistant Examiner*—Jean M. Corrielus
*Attorney, Agent, or Firm*—Schwegman, Lundberg, Woessner & Kluth, P.A.

[57] ABSTRACT

A client/server computer system having personalizable views of database data. The personalizable views programmed in client profiles which are customized for each client in the client/server computer system. The client/server computer system featuring a translator for converting client application database input and output requests into native database commands. The translator also supporting processing functions on data both retrieved from the database and stored to the database according to each individual client profile. The client/server computer system also supporting a hierarchy of preprogrammable group profiles which may be assigned to a group of clients. The client/server system also providing a security function for database data without modifying either the client applications executing on each client terminal or the native database.

8 Claims, 15 Drawing Sheets

U.S. PATENT DOCUMENTS

| | | | |
|---|---|---|---|
| 5,564,043 | 10/1996 | Siefert | 395/602 |
| 5,634,053 | 5/1997 | Noble et al. | 395/604 |
| 5,644,710 | 7/1997 | Johnson et al. | 395/186 |
| 5,646,997 | 7/1997 | Barton | 380/23 |
| 5,649,099 | 7/1997 | Theimer et al. | 395/187.01 |
| 5,649,185 | 7/1997 | Antognini et al. | 395/609 |
| 5,689,708 | 11/1997 | Regnier et al. | 395/682 |

CONVENTIONAL USER PROFILES

| ID | PASSWORD | GROUP | LANGUAGE |
|---|---|---|---|
| U1 | **** | G1 | US |
| U2 | **** | G2 | US |
| ... | ... | ... | ... |
| UN | **** | G1 | FR |

FIG. 6A

CONVENTIONAL GROUP PROFILE

| GROUP | LANGUAGE | ... |
|---|---|---|
| G1 | US | |
| G2 | US | |
| ... | ... | |
| GN | FR | |

FIG. 6B

EXTENDED SECURITY PROFILE

| USER/GROUP | VIEW | ACCESS RULE | COLUMNS AVAILABLE | DIMENSIONS |
|---|---|---|---|---|
| U1 | V1 | ROWS FOR MIDWEST REGION | C1, C2, ... | D1, D2, ... |
| G2 | V2 | ROWS FOR CURRENT YEAR | C4, C6, ... | D1, D2, ... |
| ... | ... | ... | ... | ... |

FIG. 6C

CONVENTIONAL DATABASE STRUCTURE

| DATABASE | TABLE | COLUMN | DATATYPE | ... |
|---|---|---|---|---|
| D1 | T1 | C1 | CHARACTER(2) | |
| | | C2 | INTEGER | |
| | | C3 | FLOAT | |
| | T2 | C1 | MONEY | |
| | | C2 | INTEGER | |
| | | C3 | INTEGER | |

FIG. 7A

LANGUAGE ATTRIBUTES

| CORPORATE OBJECT | LANGUAGE | NAME |
|---|---|---|
| CC1 | FR | VENTES MENSUEUES |
| CC1 | US | MONTHLY SALES |
| CC2 | FR | VENTES ANNUELLES |
| CC2 | US | YEARLY SALES |
| CV1 | FR | EMPLOYE |
| CV1 | US | EMPLOYEE |
| CG1 | FR | GROUPE PERSONNEL |
| CG1 | US | PERSONAL GROUP |
| CC4 | US | REGION |
| CC3 | US | STATE |
| CC5 | US | EMPLOYEE ID |

FIG. 7B

CORPORATE VIEW STRUCTURE

| CORPORATE GROUP | CORPORATE VIEW | CORPORATE COLUMN | DATA MAPPING |
|---|---|---|---|
| CG1 | CV1 | CC1 | D1, T1, C3 |
| | | CC2 | D1, T2, C2/100 |
| | | CC3 | D1, T1, C1 TRANSLATE ('MN' 'MINNESOTA') ('IA' 'IOWA') ('CA' 'CALIFORNIA') • • • |
| | | CC4 | D1, T1, C1 GENERATE ('MN' 'MIDWEST') ('IA' 'MIDWEST') ('CA' 'WEST') • • • |
| | | CC5 | D1, T1, C2 |

FIG. 7C

METADATA

META DATA FROM 447 IN FIGURE 4B

CORPORATE GROUP: PERSONAL GROUP

CORPORATE VIEW: EMPLOYEE

CORPORATE COLUMNS: EMPLOYEE NAME
MONTHLY BILLING STATE

U1 (ENGLISH)

CLIENT/SERVER COMPUTER SYSTEM HAVING PERSONALIZABLE AND SECURABLE VIEWS OF DATABASE DATA

FIELD OF THE INVENTION

The present invention relates to electronic data processing and in particular to computer systems capable of storing and displaying data to a number of users.

BACKGROUND OF THE INVENTION

Information stored in computers must be processed and presented in a form easily recognizable by the users of the information. Information may be organized in a structured database to facilitate access to the information, however, databases are inherently difficult to manage and often require a number of programmers to write customized programs in the native database language for presenting information to the users of the database. Often, such programs are specially designed for a particular user and require a programmer with expertise in the particular database language.

Mid-range databases, such as those found on client/server computer systems, present all of the management problems found in the larger databases, however, the users of such systems generally cannot devote a full time programmer to managing the database. Database users require different programs to provide recognizable outputs for various users of the database. For example a manager requires a different format of information than a marketeer does. A manager monitors how each of her employees perform, however, a marketeer may be more interested in how a product is selling. The manager also uses different terminology than the marketeer and so the information they require is vastly different, even though it may be stored in a common database.

Another difficulty, is that users may require a different output from the database, even if they have a common job function and work in the same department. For example, in an international corporation some managers may understand only English, but others will understand only Italian and require translation of the headings of the different database outputs. Therefore, even though both the English managers and the Italian managers require the same type of information, the language difference presents another complexity requiring more programming or another program entirely.

The tasks of maintaining the database are generally delegated to system administrators who are unfamiliar with the particular database language native to the system. If the system administrator is unfamiliar with the native database language, then the cost of generating meaningful outputs for all of the users of the database is increased, since either the system administrator must learn the native database language or hire a programmer to customize the outputs for each user. Other costs include programming and maintenance such as joining tables, result calculations, and selecting subsets of the data for specific applications. Even if the system administrator is familiar with the native database language, the task of writing new database programs is time consuming and inefficient, since minor changes in the database require constant reprogramming and maintenance as the needs of the users change over time.

Yet another problem is restricting information to specific users so that sensitive or confidential information is not freely accessible to every user of the database. This raises the same difficulties in restricting access to certain users as mentioned above for providing readable outputs, since a new program would have to be generated each time an individual user's access is restricted.

Therefore, there is a need in the art for a client/server system which is easily programmable for generating easily recognizable outputs from a database. There is also a need for an organized system of customizable views for the end users of the database. There is yet another need for a system which reduces the programming load on the system administrator of the system and is easily programmable independent of the native database language. Finally, there is a need for a client/server system which restricts database access to certain users.

SUMMARY OF THE INVENTION

The present invention solves the aforementioned problems and shortcomings of the existing art and solves other problems not listed above which will become apparent to those skilled in the art upon reading and understanding the present specification and claims.

The present disclosure describes a client/server computer system capable of producing customized views of information stored in a common database. The format of the customized views are stored in a client profile. Each client on the system has a client profile, which is tailored for that client's particular view preferences. The data stored in the client profile is sometimes referred to as "meta data" since it controls how data from the common database is presented to the client in the customized view.

Throughout this specification the terms "client" and "user" will be used interchangeably; a client meaning any end user of the client/server system. The term "database" will also be used to denote any collection of data, including a number of different subdatabases.

One embodiment of the present invention includes customizable labels for the data presented in a particular view for a particular client. A system administrator may customize a client's view with labels the client will recognize to make the view understandable by the client.

Another embodiment of the present invention incorporates a language attribute, so that the information presented to the client may be customized to their own language and dialect. For example, a French client would have a French language attribute to present all of the labels in her native French language.

One embodiment of the present invention provides programmable processing of data retrieved from the common database for viewing by the client. For example, arithmetic and formatting operations may be performed on data from the database to present the data in a recognizable form. For instance, an element stored as "MN" in the database could be displayed as "Minnesota" to the client. Likewise, information entered as "Minnesota" is updated to the database as "MN" to be consistent with the storage of elements in the database. These arithmetic and formatting operations are part of the meta data stored in the client profile as the views are customized for each client.

One embodiment of the present invention provides a hierarchy of standardized group profiles, which serve as templates of view information common to a number of clients (i.e., a group). A client profile may be initially set to one of the available group profiles, and then later customized to provide an even more specialized view for that client.

One embodiment of the present invention translates database-independent commands into native computer database commands to provide customized views for each client. The translator automatically determines the native database language and translates the database-independent commands to native database commands to access the database. This feature enables a system administrator to customize views without knowing the native database language.

Finally, one embodiment of the present invention provides a system for restricting access to the database. A client security profile is programmed to limit a client's access to a restricted dimension of the database. This security feature may be used in combination with other embodiments of the present invention, however, it is independent of the alternate embodiments of the present invention. An additional benefit is that the security feature is incorporated into the operation of the client/server system without modifying the physical database or the client-level applications executing on the system.

Therefore, the present invention solves the deficiencies of the prior art by providing a client/server computer system having programmable views of database data. The client/server computer system features embodiments having global configurability of client profiles using group profiles, database-independent functionality, and controllable access using client security profiles.

BRIEF DESCRIPTION OF THE DRAWING

In the drawing, where like numerals describe like components throughout the several views:

FIG. 6A demonstrates conventional user profiles;

FIG. 6B demonstrates conventional group profiles;

FIG. 6C demonstrates extended profiles according to one embodiment of the present invention;

FIG. 7A shows a conventional database structure;

FIG. 7B shows an example of language attributes;

FIG. 7C shows a Corporate View Structure under one embodiment of the present invention;

DETAILED DESCRIPTION OF THE PREFERRED EMBODIMENTS

In the following detailed description, reference is made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized and that electrical, logical, programming, and structural changes may be made without departing from the spirit and scope of the present invention. The following detailed description is, therefore, not to be taken in a limiting sense, and the scope of the present invention as defined by the appended claims and the equivalents thereof.

Figure 1:
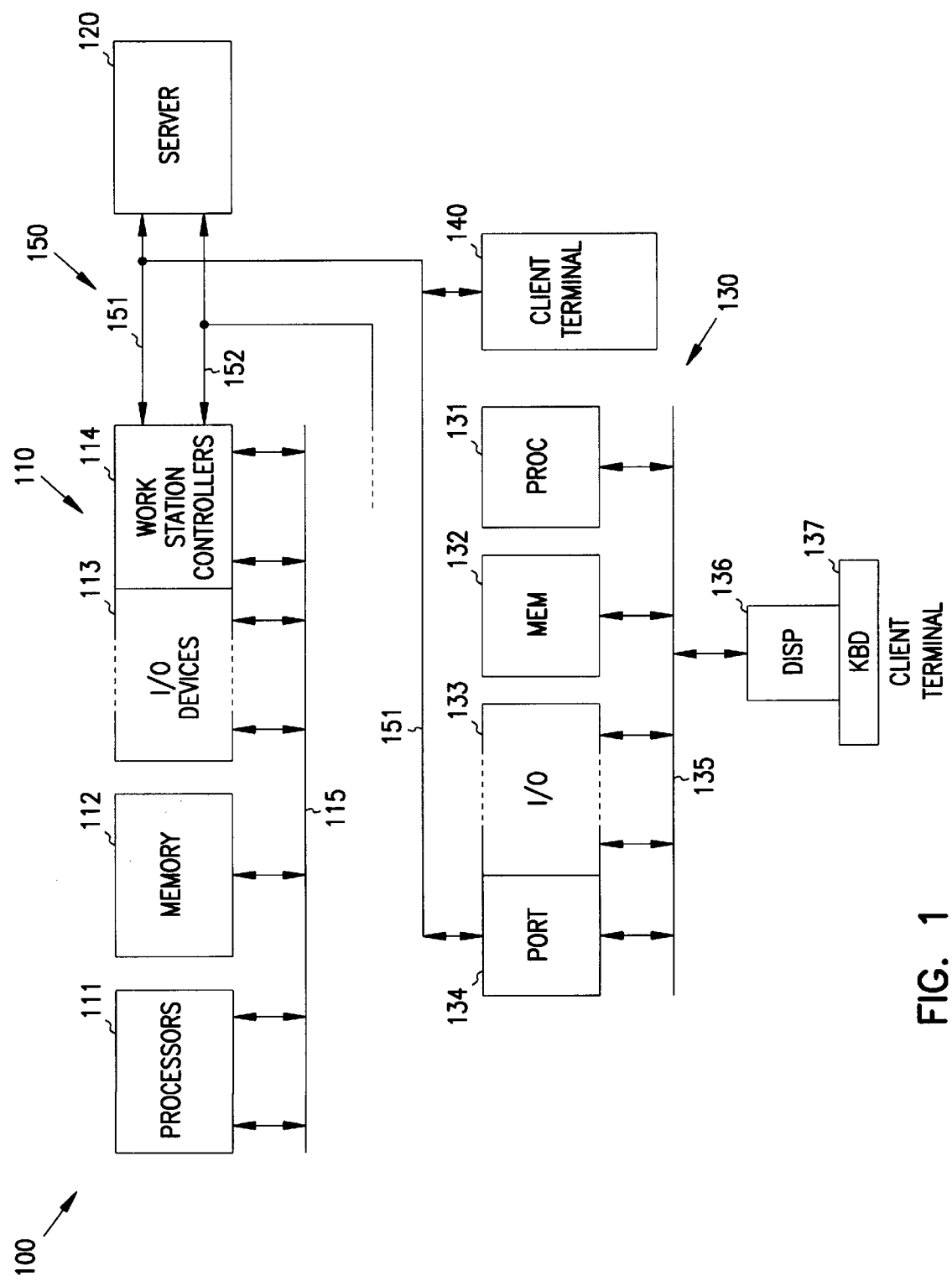
FIG. 1 shows a network of client terminals coupled to a central server, which network forms the environment for one embodiment of the present invention.

FIG. 1 shows a network 100 of computers 110–140 configured in a client/server (c/s) configuration.

Server computer 110 may be any type of system, from a relatively small personal computer (PC) to a large mainframe. In the particular implementation discussed below, server 110 is a mid-range computer, specifically an IBM AS/400 data-processing system. ("IBM", "AS/400", "OS/400", and "400" are registered trademarks of IBM Corp.) Very broadly, the AS/400 has one or more processors 111, memory 112, input/output devices 113, and workstations controllers 114, coupled together by one or more busses 115. WSCs 114 are physically a type of I/O device which interact with multiple terminals over communication facilities 150. A number of conventional facilities, such as an APPC (Advanced Program-to-Program Communication) router and LU6.2 (Logical Unit version 6.2) are available to handle the necessary communications protocols.

Additional devices, represented by block 120, may also be coupled to facilities 150 for interaction with the client terminals and with server 110. As mentioned previously, block 120 may represent one or more complete computer systems functioning as multiple servers in network 100. Communications 150 may assume any of a number of conventional forms, such as cables 151–152, switched telephone lines, wireless devices, and many others.

Client terminals 130, 140 are commonly personal computers (PCs) coupled to facilities 150 by cable 151 to form a local area network (LAN) with server 110. Other arrangements, however, may also be employed in any conventional manner. A typical PC 130 contains a processor 131, memory 132, I/O devices 133, and a port 133 coupled to cable 151. An internal bus 135 interconnects these components with a display 136 for presenting data to a user and a keyboard, mouse, and/or other input devices 137 for receiving data and commands from the user.

Figure 2:
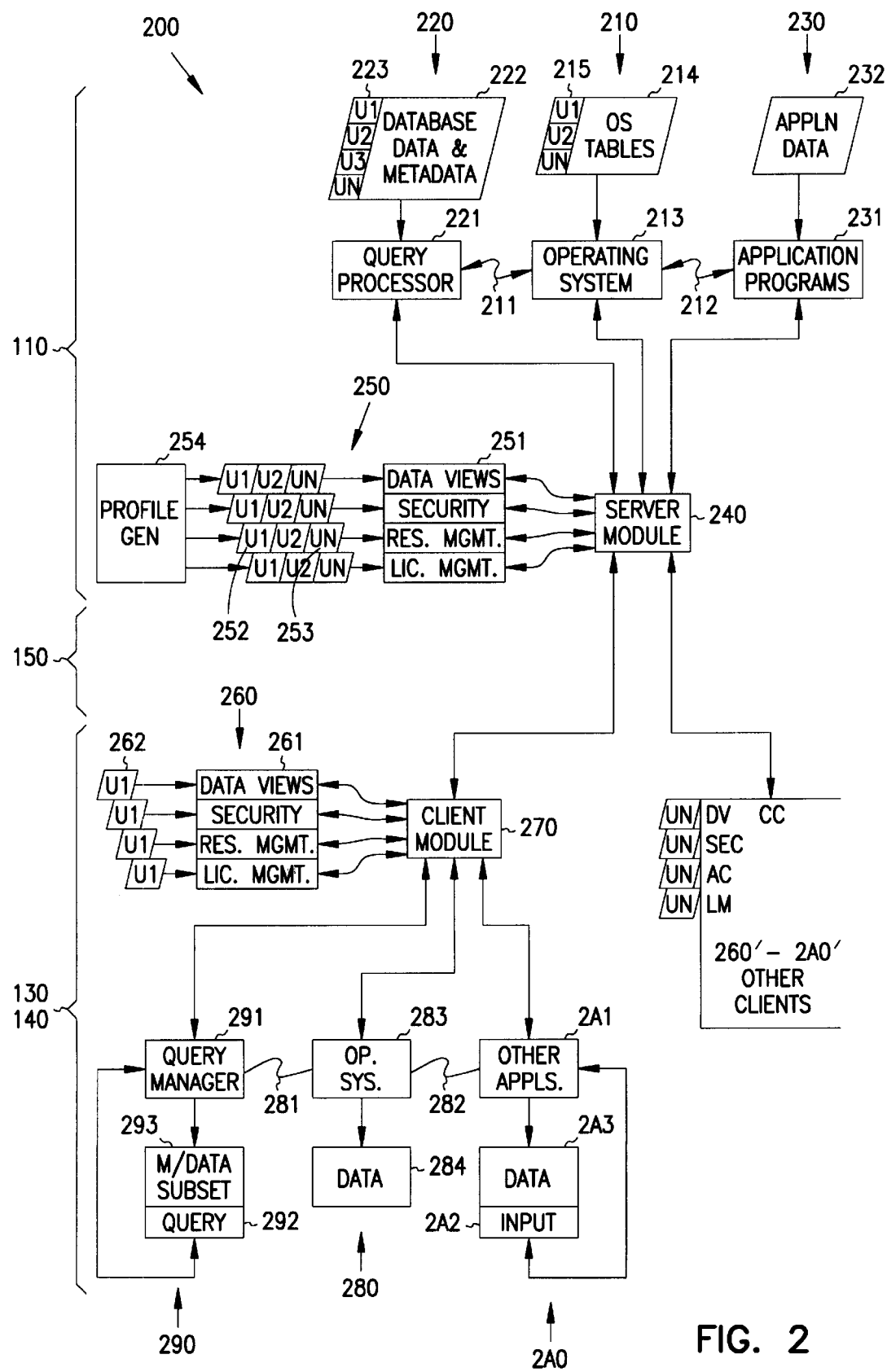
FIG. 2 is a schematic overview of the client/server network of FIG. 1, incorporating one embodiment of the present invention.

FIG. 2 shows client/server network 100 from the perspective of the functions 200 performed by the computers of FIG. 1. Brackets at the left side indicate the component functions occurring within server system 110, communications facility 150, and one of the client terminals 130. A number of different users, represented by the labels U1–UN, operate respective ones of the terminals 130–140. Any of the users may operate any terminal; the association of a particular user with a particular terminal is established when user U1, say, signs on at terminal 130 by sending his logon and password over facilities 150 to server 110. (Again, in some networks 100, a user may be able to sign on to any one of multiple servers 110–120.) The association of user and terminal persists until the user signs off from his session.

Conventional operating system 210, an IBM OS/400 in this example, manages the physical facilities of server 110, and controls the execution of tasks such as 220–230 running on the server, as symbolized by arrows 211, 212. Functional modules 213 of the operating system employ a number of tables 214 for a number of conventional purposes such as system configuration, task priorities, and security. For example, OS/400 employs a number of system user profiles 215 to specify data for each user U1–UN, including the access rights of each user to system objects (data and program commands), the language for messages to that user, and library lists.

Of the many applications which can be executed, database 220 is a typical important example. In FIG. 2, all other applications are lumped together as blocks 230. Code modules 221, 231 perform the server-resident functions of the applications upon data 222, 232. Some data may include conventional profiles 223 specifying information unique to each user U1–UN, such as the tables accessible to that user. Applications 220–230 usually require system resources to perform their tasks. For example, server I/O devices 113 may include printers and archival storage. System-controlled printers (not shown) may also attach outboard to communication facilities 150. Query processor 221 has an interactive mode wherein it executes queries and returns results as the queries are received, and a batch mode wherein operating system 210 stores incoming queries until slack periods, whereupon it passes them to be processed together in module 221. The ability to run query processor 221 at all may be considered a system resource.

Server control module 240 executes within server 110, FIG. 1, to control all communication from server functions 210–250 within server 110 to client functions 260-2A0 executing within each of the client terminals 130–140. Client module 270 executes within each client terminal such as 130, FIG. 1, to control communication from client functions 260-2A0 to server functions 210–250 executing within server 110. The control is physically mediated by transmitting and receiving data over communication facilities 150, FIG. 1. Modules 240 and 270 contain conventional cooperating protocols for packaging and timing data to be communicated between server 110 and a client 130. In addition, these modules implement conventional addressing techniques for identifying which of the clients attached to the server is to receive each data package, and for identifying to the server which client has sent each data package in the reverse direction and which user is signed on at that client.

Conventional operating system 280, for example Microsoft Windows ("Microsoft" is a registered trademark of Microsoft Corp.), manages the physical facilities of client 130, and controls the execution of tasks such as 290-2A0 running on the server, as symbolized by arrows 281, 282. Functional modules 283 of the operating system employ a number of tables 284 for a number of conventional purposes such as system configuration and task switching. In a multi-server network 100, client module 270 may also specify which server 110–120 is to receive particular data packages.

Again using a database as an example of an application program, query manager 291 receives queries 292 from the user signed on at client terminal 130, and displays resulting a resulting subset 293 of the data from tables 212 in the server. As is typical in many application programs in a client/server network, a portion 211 of the application is physically located and executes in the server 110, FIG. 1. Another portion 291 of the same application executes in the client terminal 130. This client portion 291 may be downloaded from server 110 to terminal 130 upon a request from the user, or it may reside permanently within terminal 130; in either case, it is executed by processor 131 of the terminal. Others of the application programs in terminal 130, lumped together as 2A0, may have functions similarly split between client code portions 2A1 and server portions 231, or they may execute entirely within a client terminal, using operating-system modules 213 or other modules residing within the server.

Other client terminals include similar modules, indicated in FIG. 2 as 260'-2A0'. The client modules are usually the same in each terminal. Other applications may be the same or different among the client terminals.

A set of tools cooperates with server and client modules 240 and 270 to provide additional functions by further controlling the communication of information between server 110 and clients 130–140 in network 100. At the present time, these tools provide license-management functions and control of system resources as described in commonly assigned application Ser. No. 08,414,729 filed on the same date herewith. Each tool has a portion which resides within server computer 110, and another portion which resides within each client terminal 130–140. If network 100 has multiple servers, such as 120 in FIG. 1, then another server portion resides within each server. The present invention, which provides customized views and enhanced security, has a server portion implemented in module 251, profiles 252–253, and profile generator 254 located within server 110, and a client portion implemented in module 261 and profile 262 located within each client such as 130.

Figure 4A:
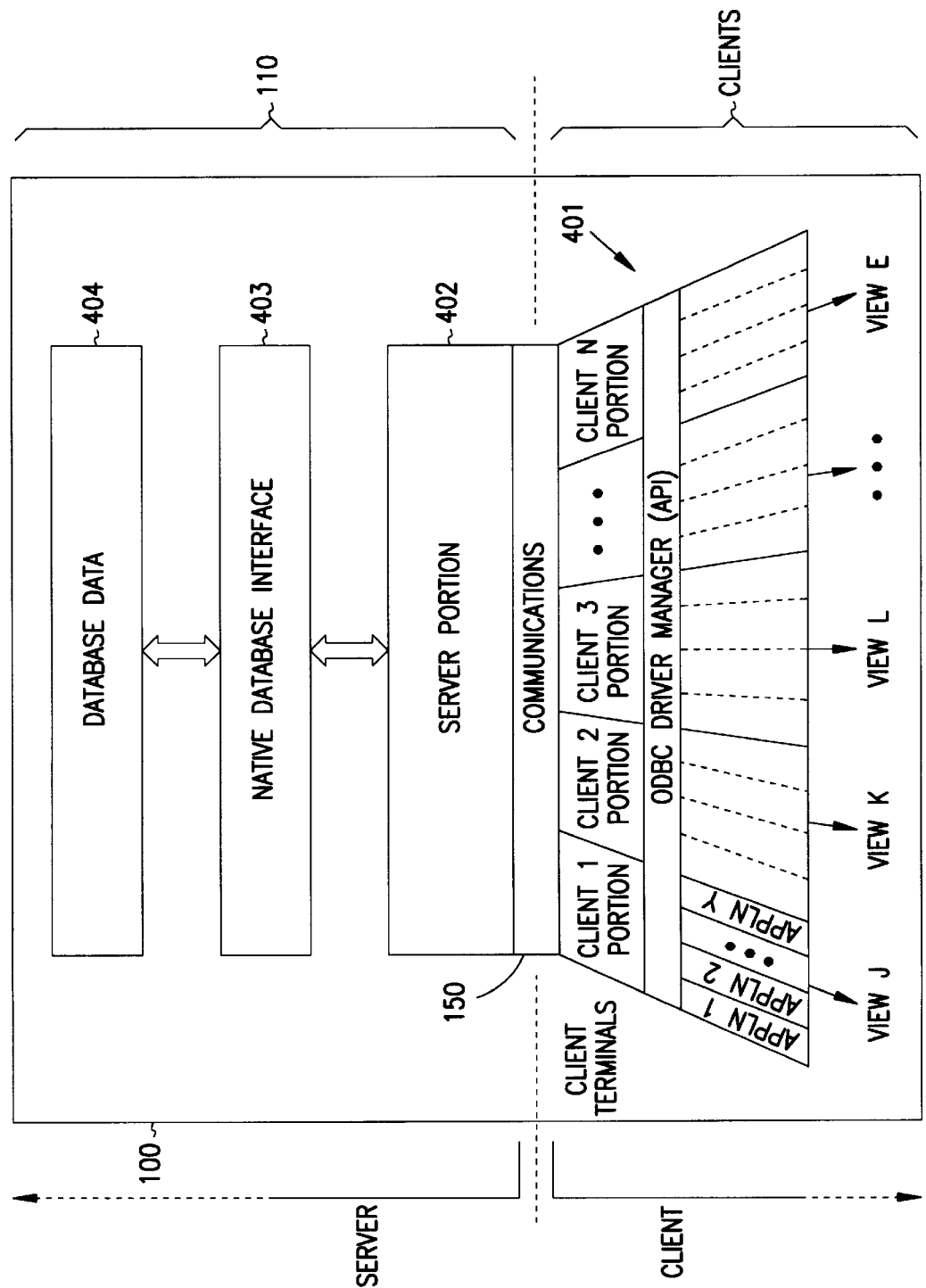
FIG. 4A is a block diagram of one embodiment of a client/server system showing a system level, server level, client level, and client application level functionality.
Figure 4B:
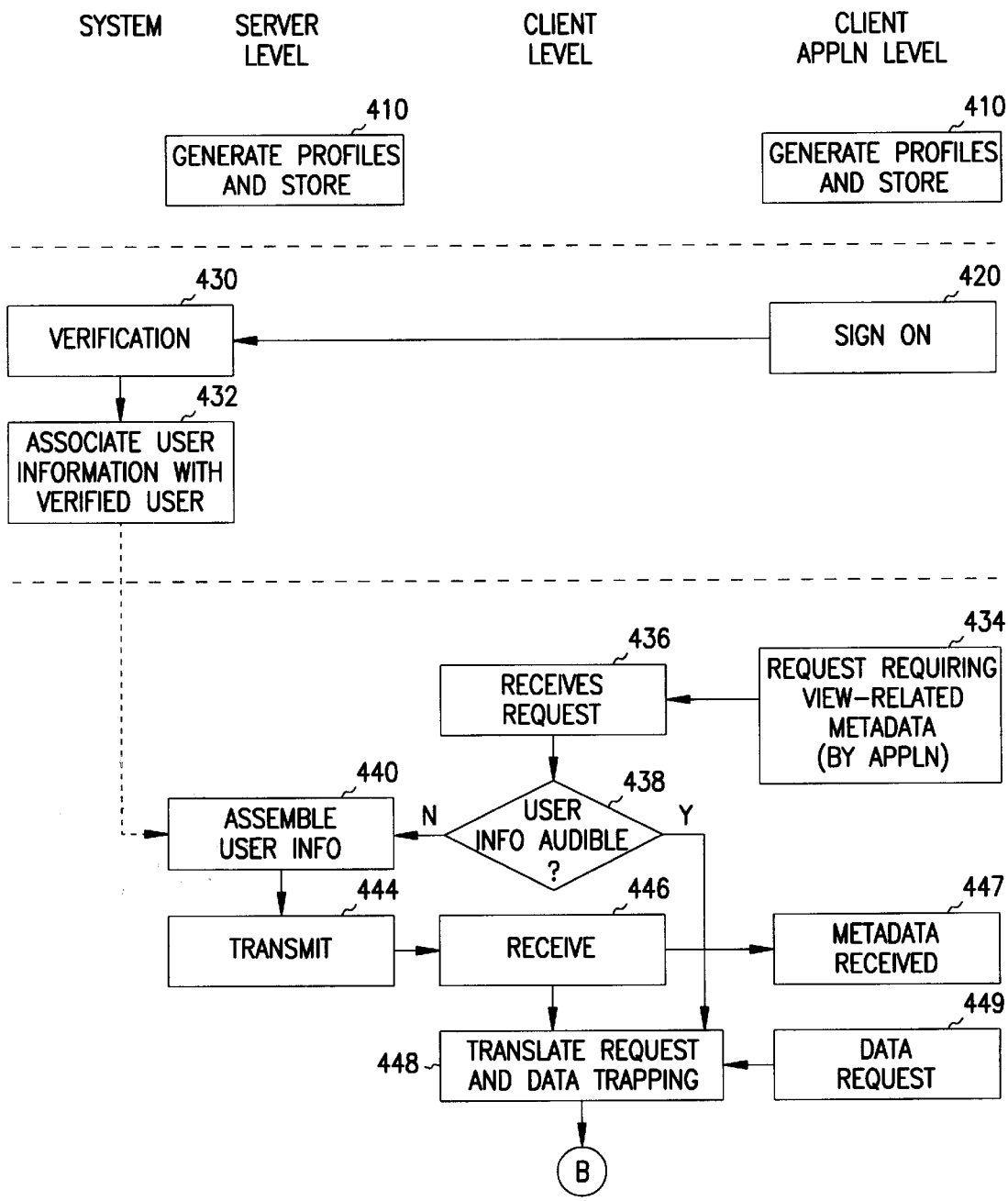
FIG. 4B and FIG. 4C are a flowchart showing the operation of the invention in the system of FIG. 2.
Figure 4C:
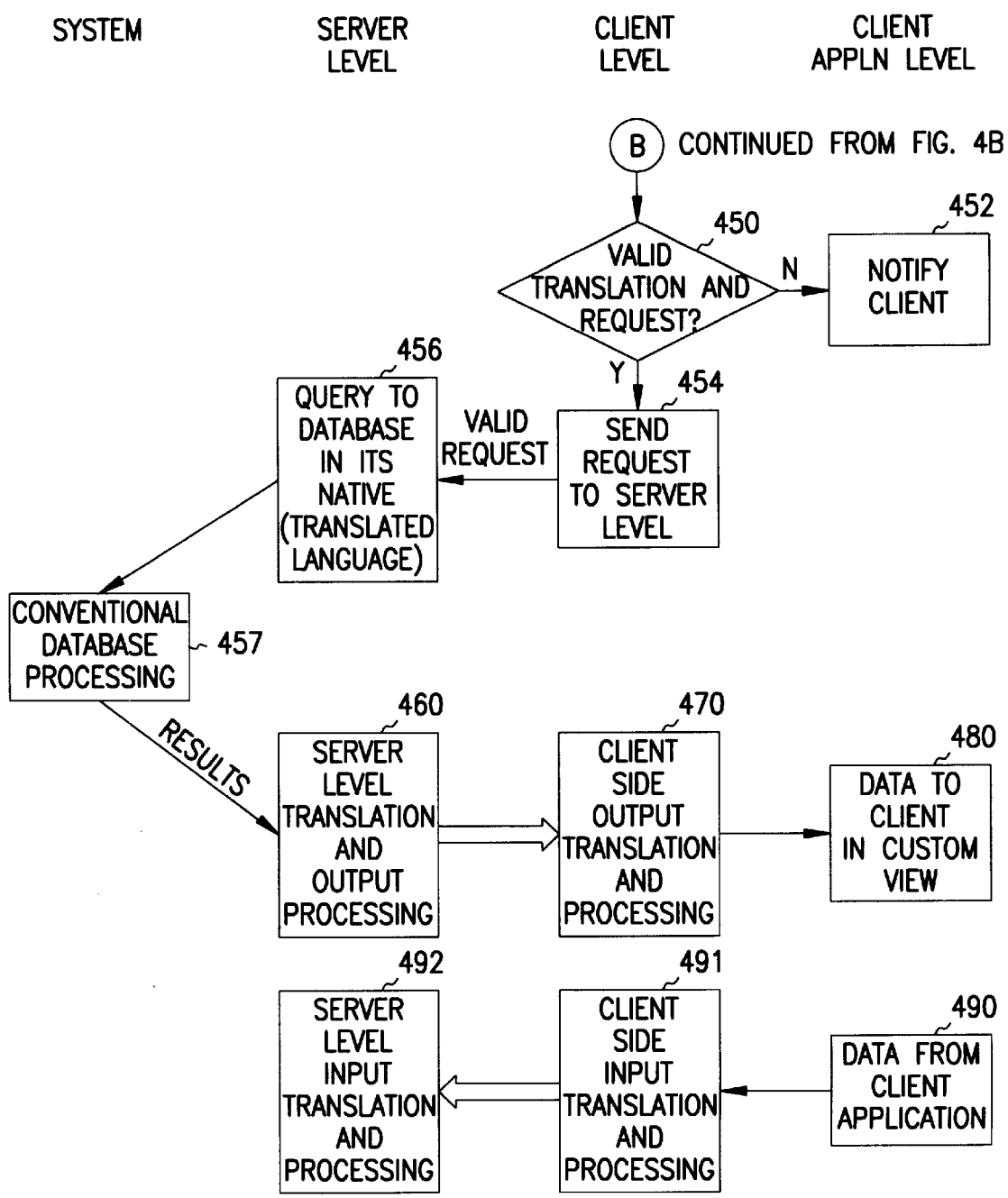

Referring now to FIG. 4A, the client portion 401 and server portion 402 are shown in a block diagram to illustrate their connection to the native database interface 403 and native database data 404. The server portion 402 communicates to the client portion 401 which comprises individual portions located in each client and connected by the communications facility 150. A standard ODBC driver manager is used to interface each individual portion of each client terminal (130 for instance) with running applications, as shown in FIG. 4A. Therefore, this embodiment of the present invention will operate at a system level, a server level, a client level and an application level, as shown in FIG. 4B and FIG. 4C, which will be discussed later.

Customized Views & Client Profiles

Figure 3:
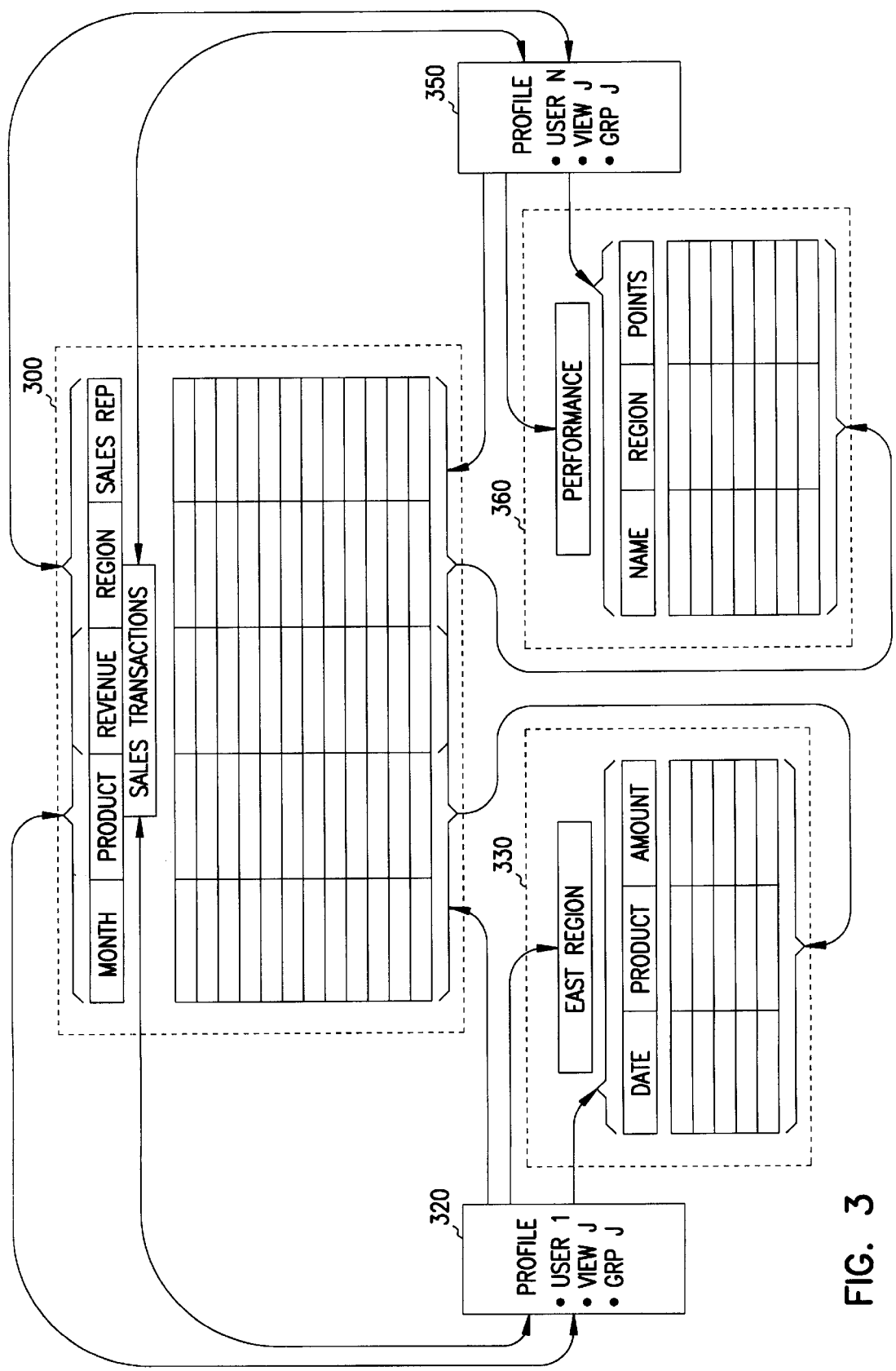
FIG. 3 illustrates typical data structures used with one embodiment of the present invention.

Referring now to FIG. 3, a portion of a typical database 300 is shown. A conventional database structure, as shown in FIG. 3 and FIG. 7A, contains the mapping of the description defining the structure and organization of the physical data. This includes tables, columns, (length & data type). Each table contains multiple rows of data matching the definition stored in the database structure.

In one embodiment of the present invention, elements from database 300 are processed and re-labeled by the client/server system to provide a client-customized view of the data. The view is specified in a programmable client profile which is personalized for each client. The client/server system reads the client profile to determine how the database information will retrieved, processed and presented to the client for each customized view. The client profile is preprogrammed by a system administrator when establishing the client's account on the client/server system.

FIG. 3 demonstrates one example of how elements in the database 300 are arranged in different customized views 330 and 360 according to different client profiles 320 and 350, respectively. For the sake of illustration, only two client profiles are shown in FIG. 3, however, one skilled in the art will readily recognize that several client profiles are possible and those shown were not intended in an exclusive or limiting sense.

In one embodiment of the present invention, client profile 320 is customized for a first client, client1, and features several personalizable views which are stored in client profile 320. FIG. 3 illustrates one view 330 which includes the East Region month, product, and revenue from database 300 which are re-labeled as Date, Product and Sales Amount, respectively, for the East Region in view 330.

This embodiment allows a programmer to process and re-label fields in any given client profile, such that the resulting views are recognizable by client(s) associated with each client profile. Therefore, views may be segregated according to region for the various salespersons in a marketing group to monitor their region's performance (view 330). Another set of views may be customized for the management of the marketing group to segregate according to salesperson for monitoring sales performance of each salesperson, as shown in view 360. Client profile 350 is customized for client n to retrieve revenue, region and sales representative information from database 300 and then process and re-label those fields to present Points, Region, and Name, respectively. Note also that the data is properly transposed and sorted according to Name as shown in view 360.

The following profiles definitions are available:

1. Conventional User Profiles

The Conventional user profile is generally standard within each operating system. An example of a conventional user profile is shown in FIG. 6A. It is used for determining who can sign on a system and what default configuration options are specified on a per user basis. For example, the user profile on an AS/400 system will contain the default language for a particular user along with default authority settings and additional system resource constraints.

2. Conventional Group Profiles

The conventional Group Profile is used for organizing a set of users within a group. An example of a conventional group profile is shown in FIG. 6B. This is used to simplify the task of security objects within the operating system. It is much easier for an administrator to secure objects within the system on a group versus user basis. Therefore, when a user changes departments within a company the administrator only need to move the user to the group for a particular department instead of having to go out to the system and changing the authorization on an object by object basis.

3. Extended Security Profiles

The extended security profile is used for applying additional security rules within a client/server environment. An example of a extended security profile is shown in FIG. 6C. It allows an administrator to apply additional security without affecting the existing operating environment. It contains the access rights applied to the data dynamically i.e. rows, columns, and dimensions through the corporate views.

Programming Client Profiles

Figure 8A:
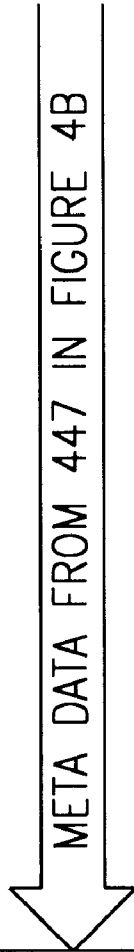
FIG. 8A illustrates an example of meta data with an English language attribute according to one embodiment of the present invention.
Figure 8B:
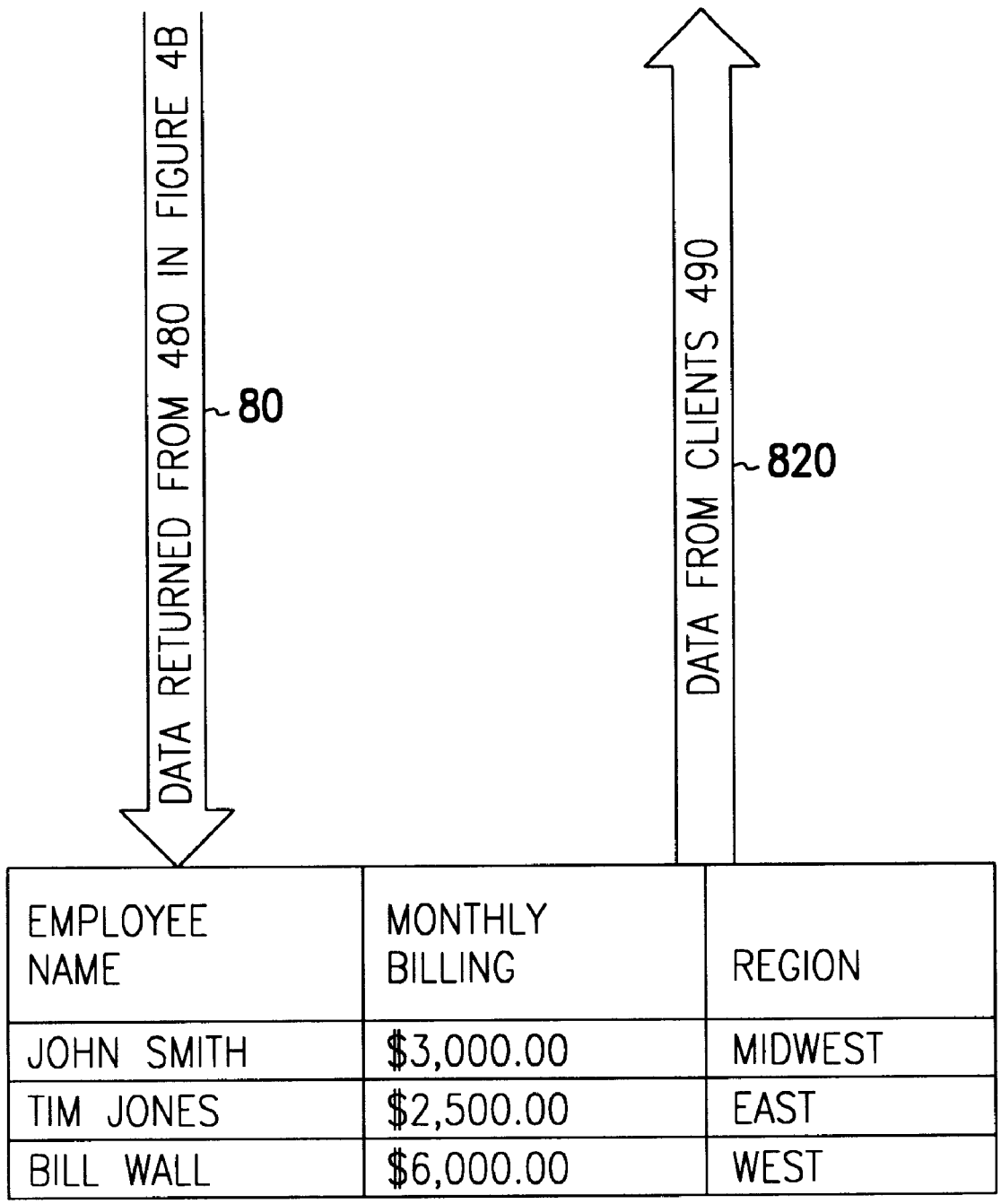
FIG. 8B depicts one example of data mapping according to one embodiment of the present invention.
Figure 9A:
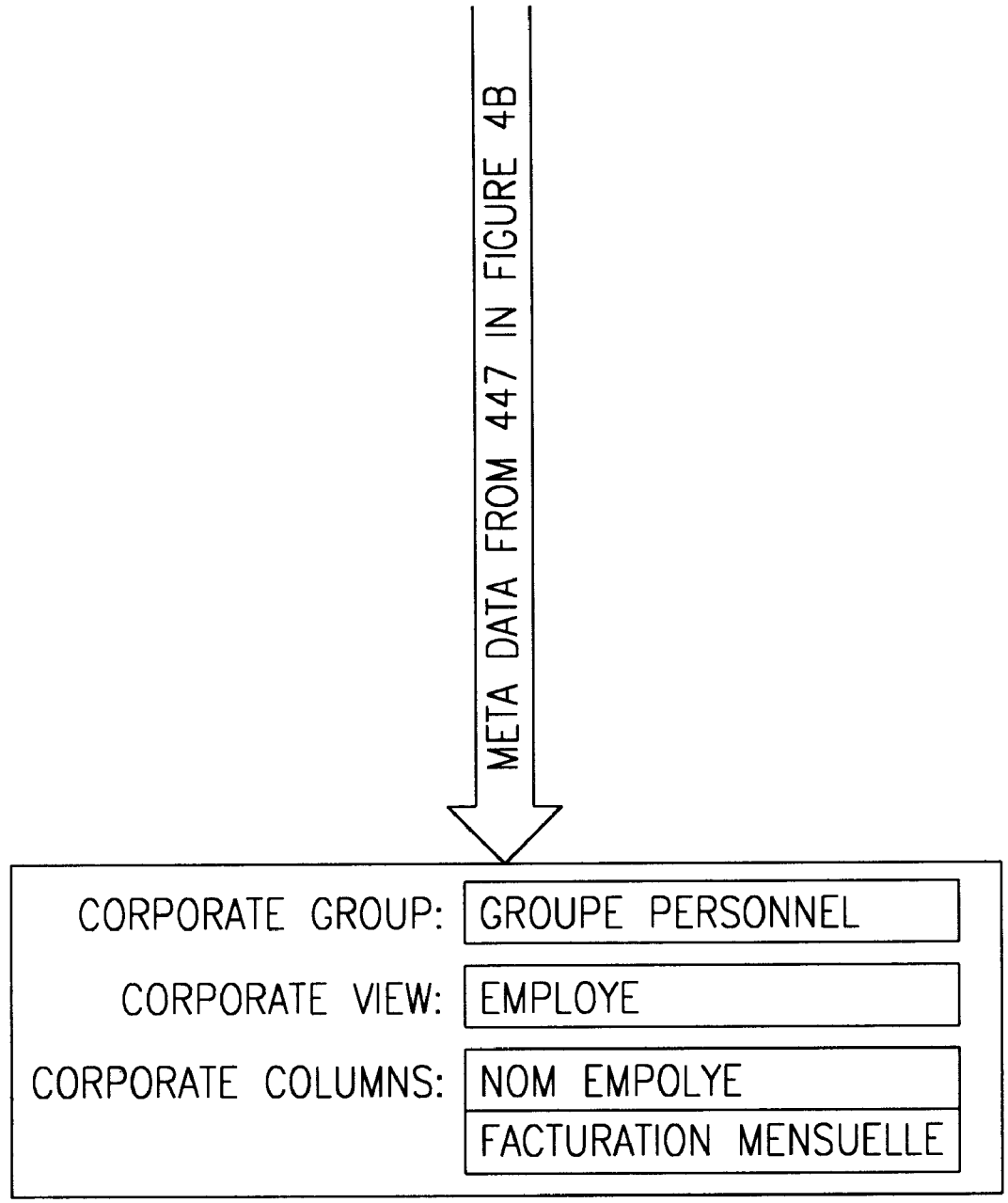
FIG. 9A and FIG. 9B are analogous to FIG. 8A and FIG. 8B, respectively, but with a French language attribute, according to one embodiment of the present invention.
Figure 9B:
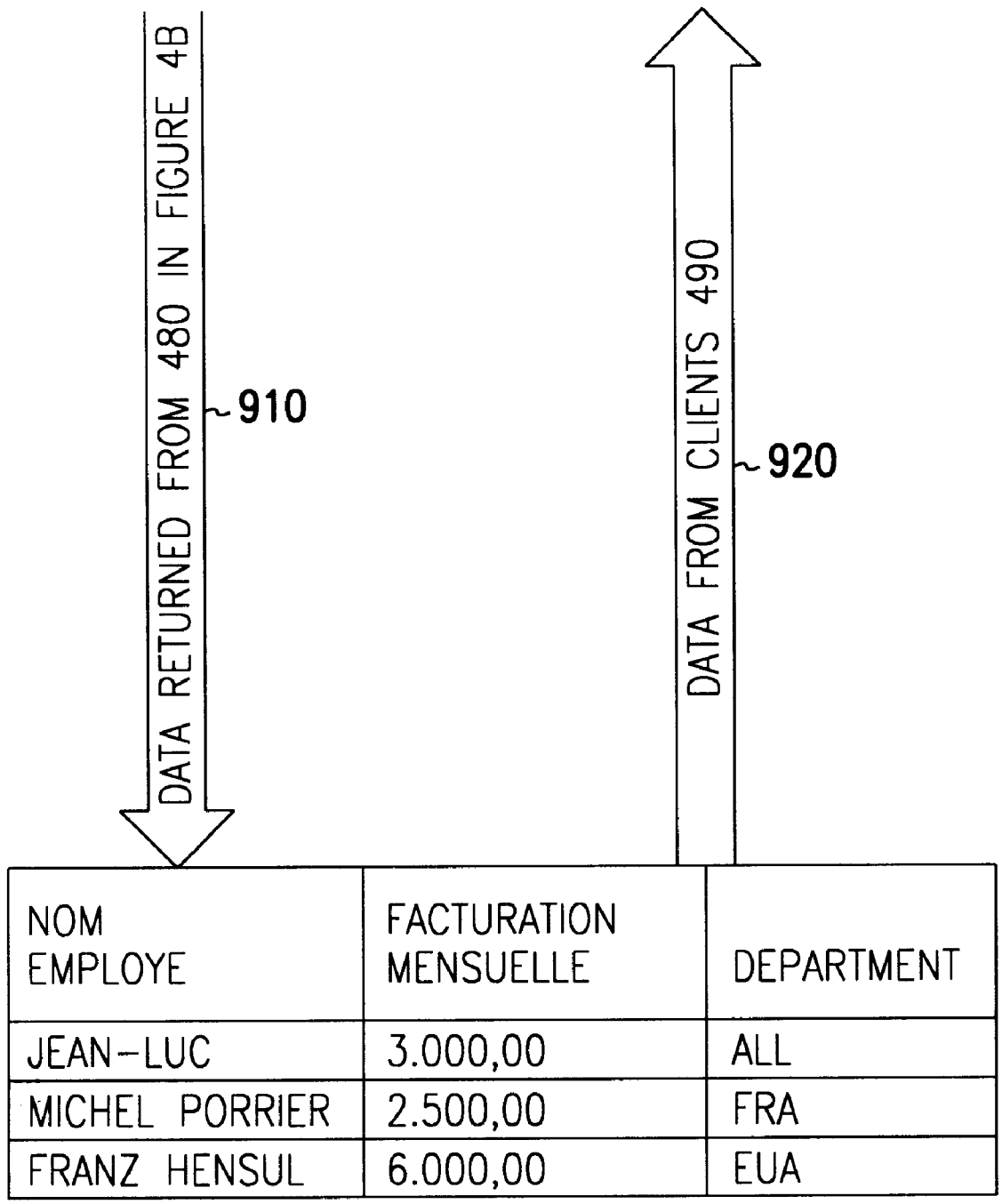

Client profiles are programmed by a system administrator for a particular client and/or group profile. In one embodiment of the present invention the following parameters may be preprogrammed as "meta data" in each client profile (See FIGS. 6A, 6B, 6C, 7A, 7B, 7C and 8A and 9A for meta data description and 8B and 9B for data mapping description. See also Example 1 below). The meta data may include:

1. subsets of the data from the database to be viewed (may be specified in row and column data or other dimensional criteria);
2. specialized labels for data in the view (such as "Monthly Sales");
3. formatting and mathematical operations (including substring, concatenation, and all spreadsheet-type mathematical operations);
4. a language attribute, which defines the spoken language used by each client and converts the view to that language for greater understandability (an example of language attributes is shown in FIG. 7B.);
5. specialized program calls for special processing on a group of parameters; and
6. data mapping between client and server (see FIGS. 8B and 9B and Example 1 below).

These parameters provide an entirely preprogrammable view for each client and provide rapid customization by modifying the parameters in the client profile. Those skilled in the art will readily recognize that this list of parameters is not intended to be exclusive or limiting and that other parameters could be specified which would not depart from the scope and spirit of the present invention.

New views may be programmed either via program "Personalizing and Securing Corporate Views" or a free form:

"Personalizing and Securing Corporate Views"

The program "Personalizing and Securing Corporate Views" is a set of dialogs that leads the system administrator through the construction of group profiles. "Corporate Views Structure" is a group profile which refers to a structure which contains information defining the data mapping for a number of specialized views called "corporate views". FIG. 7C is an example of a corporate view structure. The data mapping attributes are used to describe the processing that is required for each data element. This type of processing could be performing a calculation, translating an item (one to one), generating a value (one way), and mapping to a program for the actual data.

Group profiles define a number of different views which were preprogrammed for a specific group of users. For example, a hypothetical group profile called "Company Orders" is shown in TABLE 1, below, and contains several common business views. Another group profile, called "Human Resources" contains several common views for different employees of the corporation. This provides standard profiles for these potential users or clients of the database.

Group profiles provide a logical hierarchy of commonly available views for programming individual client profiles. Each view may be selected for a user's particular client profile. The selected view may be customized as needed for each client. The use of group profiles increases uniformity and ease of client profile programming by a system administrator.

TABLE 1

Corporate Views Hierarchy

Figure 5:
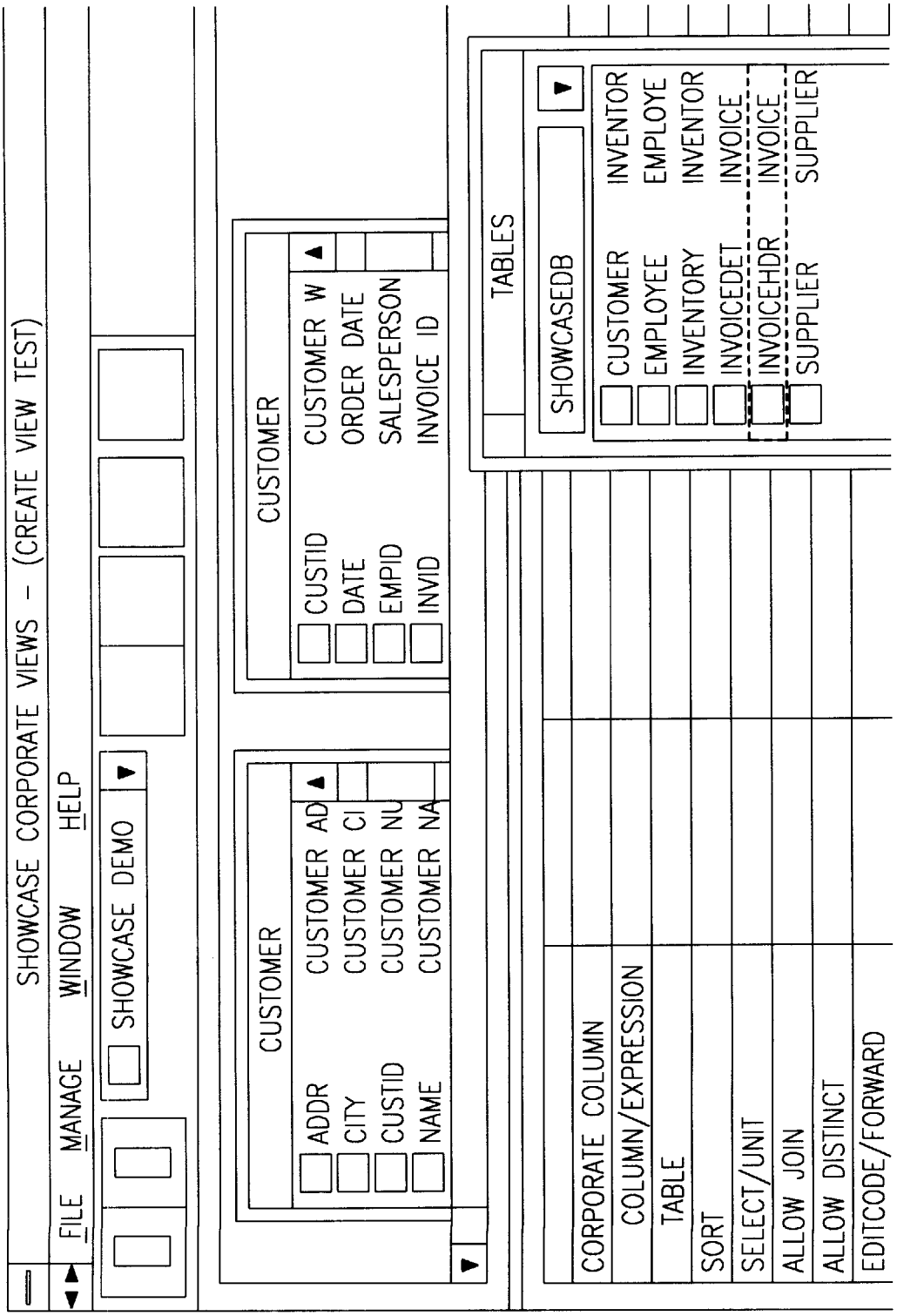
FIG. 5 illustrates a screen for free form selection of a client profile by a system administrator according to one embodiment of the present invention.

Company Orders
    Customer Orders
        Customer Number
        Order Number
        Total Amount
        Order Date
        Ship Date
    Vendor Orders
        Vendor Number
        Employee Number
        Due Date
        Amount
    Partner Orders
        Sales Number
        Order Number
        Order Date
        Ship Date
        Amount of Sale
Human Resources
    Employee Information
        Employee ID
        Employee Name
        Employee Address TABLE 1-continued Corporate Views Hierarchy Hire Date
    Job Title
    Salary
   Time Card
      Employee ID
      Hours
      OT Hours
      Total Salary Free Form Programming Free form programming is performed by a Create View program. The Create View program is executed by the system administrator to generate custom client profiles for any given client. The system administrator selects the database for which the clients will retrieve data. The Create View program retrieves column and row identifiers by using methods known to those of ordinary skill in the art and displays the columns and rows in an object oriented, click and drag user interface, as shown in FIG. 5. In sequential databases, the data is arranged in Tables, and then by Columns and Rows. Those skilled in the art will readily recognize that this approach may be applied to object oriented databases without departing from the spirit and scope of the present invention.

A view grid containing fields to be displayed in the view is also shown by the Create View interface. The system administrator will be able to select appropriate view fields and drop them on the view grid. The view grid contains the definition for each of the available fields and will include an alias name, field name, table name, description, column heading, editing information, select criteria, and whether join is allowed.

The client profile is programmed with the final view as determined by the system administrator in the Create View session. The Create View program may be used to modify a particular view as well.

Client/Server System Operation

FIG. 4B and FIG. 4C demonstrate operation of a client/server system according to one embodiment of the present invention. The operation of the client/server system in FIG. 4A is decomposed into system level, server level, client level and application level functions as stated earlier and as described in particularity below.

Client profiles are generated and stored 410 by the system administrator using server tools prior to use of the client/server system by a client and at any time thereafter. Generation and storage 410 of client profiles is performed both in the client application level and in the server level, thus two entries 410.

The broken line following generation and storage 410 indicates that this step may be performed again at any time independent of the operation of the client/server system as long as it is performed before a user attempts to access the system.

In one embodiment, client profiles are stored at the server level as they are created. Other embodiments allow storage of the client profiles at the client level.

After profiles are generated and stored 410, a client signs onto the system 420 at the client application level and is verified 430 at the system level to determine an appropriate client profile for the user 432. Another broken line signifies that the remaining steps occur only after a request requiring view-related meta data 434 by the application program is received at the client application level (during the execution of the one or more applications on any given client terminal (e.g., 130)). After request 434 is issued, it is then received 436 at the client level by the client portion 401 associated with that client terminal (e.g., 130).

The client/user system then must translate the request into the native database language, but can only do so if the user information (meta data from the user profile) is available at the client level 438. If the data is not available (i.e., following a first request for translation) the associated user profile meta data 432 is used to construct the user information 440 needed by the client portion of the client/server system 401 at the client level. The user information is then transmitted 444 to the client portion of the client/server system 401 residing in the client level. The client information is received 446 at the client level and sent to the translator 448 where data mapping and command translation is performed. (The translator is described below). User profile meta data is sent to the client terminal (e.g., 130) 447 for use by the client application. This enables the client application to incorporate the views defined by the user profile. The client may select data and issue a data request 449 which is translated and mapped according to the user profile meta data, as shown in step 448.

If the request 449 is valid 450, then the translation is performed and the request is sent to the server level 454, else the client is notified of an unacceptable attempted access 452 at the client application level. Once the request 449 is validated and received by the server level the request is in the native command language of the database and the query is performed via conventional database processing 457. The results are further translated and processed at the server level 460 and then transmitted to the client level for client side translation and processing 470. Finally, the view data from request 449 is received by the client terminal (e.g., 130) and the resulting data is presented in the customized view to the client per the client profile 480.

When data from the client application level must be input into the database, it requires that the translator reverse any processing and translation (according to the client profile) before storing the data from the client application in the database 404. Therefore, data from the client application 490 is also translated and processed to ensure that it is in the same form as other data stored in database 404. This "reverse processing and translation" occurs at both the client level 491 and the server level 492 as shown in FIG. 4C.

Example 1, below, illustrates meta data and data mapping functions of one embodiment of the present invention. Refer to FIGS. 4B, 4C, 7A, 7B, and 7C throughout the example:

EXAMPLE 1

Meta Data & Data Mapping Definition

U1 (English User)

1. 420—User signs on to the system
2. 430—User verified on the system
3. 432—Associated user information. Return the language for the user
4. 434—Application requests the meta data information
5. 436—Client side processing receives the request
6. 438—Client side determines if the information is available at the PC. Otherwise, it sends a request to get the meta data information from the Server.
7. 440—Assemble meta data based on user.
8. 444—Transmit the data to the client side
9. 446—Receive and store meta data for the user.
10. 447—Application displays the meta data information to the user. See FIGS. 8A and 9A for examples of the display for both an English language attribute and a French language attribute, respectively.

11. 449—Application requests the data based on the selected meta data.

For example, if the application requests data for monthly sales and state for all employees in the midwestern region, the following SQL statement would be received: SELECT Monthly Sales, State FROM Employee WHERE Region= 'MidWest'

12. 448—Client side translates language dependent meta data and optionally maps data to the appropriate values.

This would get translated to the following request and sent to the Server (454): SELECT CC1, CC3 FROM CV1 WHERE CC4='MidWest'

13. 450—If translation or data mapping from 448 is not valid than an error is returned to the application (452).

14. 454—Client side sends request to the Server.

15. 456—Request is translated and data is mapped before processing using conventional interfaces (SQL or native requests)457.

Server receives SQL statement from 448 or step 12 and translates it to the following: SELECT T1.C3, T1.C1 FROM D1.T1 WHERE T1.C1 IN ('MN', 'IA', 'WI', etc . . . ).

16. 460—Server maps the data using the data mapping in the Corporate View structure (FIG. 7c).

Server maps the T1.C1 to CC3 using the data mapping in FIG. 7c: For example, if T1.C1 value is MN then it will be mapped to Minnesota.

17. 470—Client side translates and delivers data to 480. See FIGS. 8B and 9B for examples of this display for both an English language attribute and a French language attribute, respectively. (See arrows 810 and 910 respectively).

Client side translation is used when the mapping tables are small. Threshold limits are customizable by the system administrator. In the above example it would be possible to have the T1.C1 to CC3 mapping done on the client by setting the threshold appropriately.

18. 490—Application sends data modification request (Insert, Update, Delete) to the client side. See arrows 820 and 920 of FIGS. 8B and 9B, respectively.

For example, if the application requests to update the monthly sales for an employee, the following SQL statement would be received: UPDATE Employee SET Monthly Sales=550.00 WHERE Employee Id=100

19. 491—Client side translates language dependent meta data and optionally maps data to the appropriate values.

This would get translated to the following request and sent to the Server (454): UPDATE CV1 SET CC1=550.00 WHERE CC5=100.

20. 492—Server side translates language independent meta data and optionally maps data to the appropriate values.

This would get translated to the following request and sent to the Server (454): UPDATE D1.T1 SET T1.C3= 550.00 WHERE T1.C2=100.

In one embodiment of the present invention a translator is included which translates database-independent instructions generated by programming the client profile and translated into the native database language for database access by executing applications. This enables the system administrator to customize views using database independent programming of the client profiles without having to know the native database language of the server 110. The translator is designed to recognize and retrieve database objects or elements from several database products including Synon, LANSA, JDE.

One embodiment of the present invention can transparently retrieve data from a database comprising different subdatabases, subdatabase1 and subdatabase2. For example, subdatabase1 could be a Synon formatted database and subdatabase2 a LANSA formatted database. The translator is programmed to recognize the various formats of each subdatabase and transparently retrieve information requested by each client according to the client profiles as assigned by system administrator.

One skilled in the art will readily recognize that any combination of subdatabases can be translated without departing from the scope and spirit of the present invention and that the examples given herein are intended only for illustration and are not to be limiting or exclusively interpreted. One skilled in the art will also recognize that the mapping of views to workstations need not be unique, nor exclusive.

Security

An alternate embodiment of the present invention limits access to a client based on the programming of a client security profile. In one embodiment, the client security profile is programmed to allow access to any of the tables and fields as defined by FIG. 6c. The meta data information received in 446 in FIG. 4b is filtered based on the user's profile. The meta data received by the application in 447 is filtered and only contains meta data that is valid for the user.

Requests received in 448 are validated using the security rules returned in the meta data. In addition the translation in 456 & 491 includes the addition of security filtering on the data, i.e. row level security. The data returned to the client application in 490 will only return information that the user is authorized to access.

Security verifications regarding queries/insertions which are field (or column) intensive and not data intensive may be performed at the client level and without translation, by simply applying the client security profile to the attempted query/insertion. Security verifications which are data intensive (or row limited) must be translated prior to verification.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and equivalents thereof.

We claim:

1. A method for managing access to data in a database, the database residing on a computer system, the computer system including a server system and one or more client systems, the method comprising the steps:

when a user signs on to the computer system from one of the one or more client systems, verifying the user by the steps including:

identifying the user; and associating a profile with the user, wherein the profile is unique to the user and contains meta data providing for the user a plurality of programmable views of and mappings to elements of the database, the profile residing on the server system;

retrieving a subset of the meta data according to the profile;

modifying an interface for the user in an application executing on the client based on the subset of the meta data;

generating a data request based on the subset of the meta data;

translating the data request on the client system according to the contents of the profile;

creating a data results set on the server system by servicing the translated data request on the server system;

translating the data results set on the client system according to the contents of the profile to generate a translated data results set; and displaying the translated data results set on a display device of the client system.

2. The method of claim 1, wherein the step of when a user signs on to the computer system from one of the one or more client systems, verifying the user further comprises associating a plurality of group profiles with the user, and wherein the step of translating the data request further comprises translating the data request according to the contents of the plurality of group profiles associated with the user, and wherein the step of translating the data results set further comprises translating the data results set according to the plurality of group profiles associated with the user.

3. A system for managing access to data in a database, the database residing on a computer system, the computer system comprising at least one server system and one or more client systems connected to the at least one server system, the system comprising:

a plurality of profiles, each profile created for one of a plurality of users including personalizable meta data for controlling access to the data in the database;

a first portion executing on the server, for identifying each user signing onto the server system and for associating a profile with each user signing onto the server system;

a second portion executing on each client system for retrieving a subset of each profile associated with each user signing onto the server system;

an application executing on each client system for creating a data request based on each of the subsets, the application using the subsets to configure user interfaces for each user;

a third portion executing on each client system for translating the data request based on each profile and for transmitting a translated data request to the server system;

a fourth portion executing on the server system for servicing the translated data request and transmitting a result to the client system making the translated data request; and a fifth portion executing on each client system processing the result according to the profile of each user of each client system.

4. The system of claim 3, further comprising a plurality of group profiles which define one or more views available for association to one or more users.

5. The system of claim 3, wherein the plurality of profiles are programmed to limit access of the one or more users to certain data in the database.

6. A system for managing access to data in a database, the database residing on a computer system, the computer system comprising at least one server system and one or more client systems connected to the at least one server system, the system comprising:

a plurality of profiles, each profile created for one of a plurality of users including personalizable meta data for controlling access to the data in the database;

a server program executing on the server, the server program identifying each user signing onto the server system and for associating a profile with each user signing onto the server system, the server program processing translated data requests from the one or more client systems and transmitting a result to each of the one or more client systems issuing the translated data requests; and for each client system of the plurality of client systems:
an application executing on each client system, the application creating a data request based on profile meta data, the application using the profile meta data to configure user interfaces for each user; and a client program executing on each client system, the client program:
retrieving a subset of each profile associated with each user signing onto the server system;
translating the data request by the application based on each profile;
transmitting a translated data request to the server system; and
processing the result according to the profile of each user for each client system.

7. The system of claim 6, further comprising a plurality of group profiles which define one or more views available for association to one or more users.

8. The system of claim 6, wherein the plurality of profiles are programmed to limit access of the one or more users to certain data in the database.

\* \* \* \* \*

UNITED STATES PATENT AND TRADEMARK OFFICE
CERTIFICATE OF CORRECTION

PATENT NO.: 6,134,549

DATED: Oct. 17, 2000

INVENTOR(S): Regnier et al.

It is certified that error appears in the above-identified patent and that said Letters Patent is hereby corrected as shown below:

In the title, delete "HAVING PERSONALIZABLE AND SECURABLE VIEWS OF DATABASE DATA" and insert --USING PROFILES TO CUSTOMIZE DATA DISPLAY AND CONTROL DATA ACCESS--, therefor.

Signed and Sealed this

First Day of May, 2001

*Attest:*

NICHOLAS P. GODICI

*Attesting Officer*  *Acting Director of the United States Patent and Trademark Office*